Jan. 14, 1969 TADAKI KAWADA 3,421,167
CENTER DIAGONAL STAYS FOR USE IN SUSPENSION BRIDGES
Filed Dec. 2, 1966

Tadaki Kawada
Inventor
by George B. Oujevolk
Attorney

United States Patent Office 3,421,167

Patented Jan. 14, 1969

3,421,167

CENTER DIAGONAL STAYS FOR USE IN SUSPENSION BRIDGES

Tadaki Kawada, Hirakata-shi, Osaka-fu, Japan, assignor to Kawada Kogyo Kabushiki Kaisha, Naejima, Fukunomachi, Higashi Tonami-gun, Toyama-ken, Japan, a corporation of Japan Filed Dec. 2, 1966, Ser. No. 598,650

U.S. Cl. 14—18 3 Claims

Int. Cl. E01d *11/00;* E01d *17/00*

ABSTRACT OF THE DISCLOSURE

Stays for a suspension bridge to improve the rigidity and vibration absorbing characteristics of suspension bridges connected between the midpoint of the suspension bridge cable and two points on a girder suspended from the bridge cable.

This invention relates to center diagonal stays for use in suspension bridges.

While it is well recognized in the art that suspension bridges are one of the various structures which are subjected vibrations relatively frequently. Whether the vibration may be a bending vibration or a twisting vibration, in most cases, these vibrations assume a waveform of oppositely symmetrical primary type with its node at the center of the span.

In order to suppress occurrence of such a vibrational waveform it has already been proposed to use rods or cables as the center diagonal stays. However, use of such stays has been based on simple consideration that the center diagonal stays function to maintain the required rigidity of the entire suspension bridge so that solid or non-extendible stays are satisfactory for this purpose. However, even neglecting the effect of the stress caused by the actual load on the suspension bridge, when the reinforcing girder of the bridge vibrates with a large amplitude around the center thereof owing to such external force as strong wind, the points of connection between the stays and the reinforcing girders will be shifted greatly. Therefore, when rods are used as stays they are liable to be broken by compressive force, thus greatly increasing the chance of damaging the stays. On the other hand, when flexible cables are used as the stays they can resist tension to some extent but they have no resistance against compression. Consequently, normally only one stay on either side will be effective, thus decreasing their usefulness to one half. Thus, center diagonal stays utilizing rods or cables as stays as has been the practice in the past can not fully realize their theoretical merits.

The invention contemplates to use buffer members such as springs or oil dampers as the center diagonal stays so as to improve the rigidity and vibration absorbing characteristics of suspension bridges. These buffer members are connected between the mid point of the suspension cable of the bridge and points equally spaced from the center of the reinforcing girder.

Figure 1:
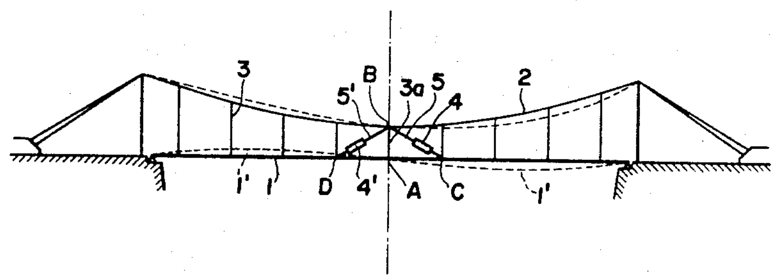
Figure 2:
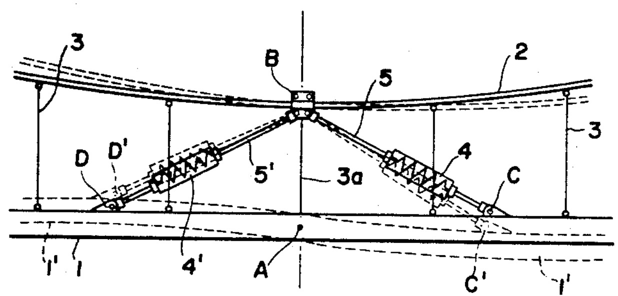

The features of the invention which are believed to be novel are set forth with particularity in the appended claims. The invention itself, however, as to its organization together with further objects and advantages thereof, may best be understood by reference to the following description taken in connection with the accompanying drawing, in which:

FIG. 1 is a diagrammatic representation of the entire suspension bridge embodying this invention, with the mode of vibration at the time of vibration being indicated by dotted lines; and FIG. 2 is an enlarged side view of a portion of the suspension bridge shown in FIG. 1 to illustrate the construction of stays embodying this invention.

Referring now to the accompanying drawing, the suspension bridge shown therein comprises a reinforcing girder which is supported by a suspension cable 2 through a number of longitudinally spaced hanger members 3. The hanger member 3*a* which is located at the longitudinal center of the reinforcing member 1 is located vertically between the mid point A of the reinforcing girder 1 and the mid point B of the supporting cable. Between the point B at which the upper end of the hanger member 3*a* is connected to the mid point of the cable 2 and two points C and D which are equally spaced from the mid point A of the supporting girder on the opposite sides are respectively connected opposite ends of diagonal stays 5 and 5′ comprising buffer devices 4 and 4′ such as springs or oil dampers so as to constitute center diagonal stays.

Since, in accordance with this invention, stays 5 and 5′ including buffer devices 4 and 4′ consist of springs, oil dampers and the like, such stays not only can resist against compression as well as tension, but also suffer smaller fatigue upon being subjected to repeating loads, than rods or cables. More specifically, when the reinforcing girder 1 vibrates as shown by dotted lines of FIGS. 1 and 2 the connecting points C and D will be displaced to points C′ and D′. Accordingly even when respective stays 5 and 5′ are simultaneously subjected to large compression and tension stresses, respectively, there is no fear of breakage. Further, different from flexible cables which can withstand to forces in only one direction they can equally resist to compression as well as tension stresses without any trouble. Thus, the diagonal stays of this invention can provide very satisfactory characteristics which well coincides with the result of theoretical calculation.

In addition to the above mentioned merits there is a following merit. Thus, since the oscillation having a wave shape mentioned above functions to impart a rapid force against stays, if the stays were made of rods, they are broken not only by the cause mentioned above but also by the force of impact. However, stays constructed in accordance with the principle of this invention would never be affected by the rapid vibrating pressure but instead effectively act in porportion to the force imparted thereto by vibration deformation. In other words, the stays will provide a large reactive force against large deformation whereas a small reactive force against small deformation, thus further increasing the effectiveness of the center diagonal stays.

In the case of such a vibration deformation the force exerted by the stays which act as buffer devices will depress downwardly the one side of the reinforcing girder which has been elevated whereas pull up the other side which has been forced to descend by the vibration. In this manner, the center diagonal stays according to this invention always function to exert upon the girder forces in the direction opposite to that of the forces created by the vibration of the suspension bridge, thus largely absorb the vibration thereof.

While the invention has been explained by describing particular embodiments thereof, it will be apparent that improvements and modifications may be made without departing from the true spirit and scope of the invention as defined in the appended claims.

What is claimed is:

1. A suspension bridge comprising a supporting cable, hangers connected thereto at spaced intervals and suspending a girder therefrom, and, resilient stays comprising buffers connected between the midpoint of said cable and two points on said girder equally spaced from the midpoint of said girder.

2. A suspension bridge according to claim 1 wherein said resilient stays comprise a compressible spring.

3. A suspension bridge according to claim 1 wherein said resilient stays comprise an oil damper.

References Cited

UNITED STATES PATENTS

| | | | |
|---|---|---|---|
| 2,062,983 | 12/1936 | Baticle | 14—18 |
| 2,358,672 | 9/1944 | Vartia | 14—18 |
| 2,457,425 | 12/1948 | Wolfard | 14—18 X |
| 2,457,427 | 12/1948 | Wolfard | 14—18 |

JACOB L. NACKENOFF, *Primary Examiner.*